United States Patent [19]

Tabler

[11] 3,768,614
[45] Oct. 30, 1973

[54] CONVERTIBLE ROLLER WAY CONVEYOR
[75] Inventor: Charles P. Tabler, Hamilton, Ohio
[73] Assignee: Kornylak Corporation, Hamilton, Ohio
[22] Filed: Mar. 10, 1972
[21] Appl. No.: 233,691

[52] U.S. Cl. .............................................. 193/37
[51] Int. Cl. ............................................ B65g 13/00
[58] Field of Search ........................... 198/202, 127; 193/35–37

[56] References Cited
UNITED STATES PATENTS
1,038,514  9/1912  Anderson ............................... 193/37
3,127,003  3/1964  Goepper ........................... 198/127 R
3,176,828  4/1965  Sullivan .............................. 193/35 C
3,263,797  8/1966  Lutes .................................. 198/127 R FOREIGN PATENTS OR APPLICATIONS
626,874  7/1949  Great Britain ...................... 198/202
1,264,575  5/1961  France ............................... 193/35 R Primary Examiner—Richard E. Aegerter
Attorney—Thomas E. Beall, Jr.

[57] ABSTRACT

The roller way conveyor system of the present invention provides for the transport of articles supported on two inclined runs of freely rotatable horizontal axis rollers from one end to the other end, and the conveying of articles unsuited for support between the roller runs on a plurality of pipes freely supportable on and extending between the roller runs. Preferably, the pipes and rollers are freely journaled to provide solely for gravity conveying of articles carried thereon, and axial restraint means or confining means are provided to limit the axial movement of the pipes when supported on the rollers and to correspondingly limit the axial movement of articles supported on either the rollers or pipes. The rollers are equipped with elastomer tires having hysteresis properties so that there will be a controlled speed for conveyed articles, an accommodation of uneven article surfaces, quieter operation, and a firm adapting support of the pipes.

9 Claims, 7 Drawing Figures

PATENTED OCT 30 1973　　　　　　　　　3,768,614

CONVERTIBLE ROLLER WAY CONVEYOR

BACKGROUND OF THE INVENTION

Applicant's prior gravity type roller way conveyors, as shown in U.S. Pat. No. 3,057,448, issued Oct. 9, 1962, and U.S. Pat. No. 3,443,674, issued May 13, 1969, have provide to be extremely useful in the conveying of various types of articles, under controlled speed, including pallets having uneven, discontinuous, and often times defective under surfaces. However, such parallel roller run conveyors have the inherent disadvantage that they cannot convey relatively small articles that do not transversely extend between the roller runs, and they cannot convey articles having sharp rims, which rims would fall between adjacent rollers, for example. However, they are light weight and open, which is desirable and can normally carry most tyes of articles that are to be conveyed. However, there has been no satisfactory solution to the above-mentioned problems without resorting to an entirely different type of conveyor, which would do away with the known advantages of the parallel roller run type of conveyor of the above-mentioned patents.

It is further known to provide a single run of parallel axis rolls in the construction of a conveyor, as shown by the Thomas U.S. Pat. No. 896,172, issued Aug. 18, 1908. This type of conveyor has considerable advantages with respect to the conveying of articles having very little transverse dimension, but does not have the advantages of the parallel run type of conveyor above-mentioned.

SUMMARY OF THE INVENTION

It is an object of the present invention to overcome the above-mentioned disadvantages of the parallel roller run type of conveyor for conveying articles otherwise unsuited, by providing for the conversion of the parallel roller run conveyor into a conveyor with a single run of rolls. The rolls are freely supported at opposite ends on adjacent ones of the rollers of the respective roller runs, and restrained in the axial direction by means of guide rails, interengaging flanges and the like.

Preferably, the rollers of the parallel runs are provided with elastomeric tires for the known advantages with respect to their usage in a parallel run type of conveyor, and to control the speed of articles carried by the rolls on conversion, as well as to allow for irregularities in the articles and rolls that would tend to call for a differential vertical movement between adjacent supporting rolls.

BRIEF DESCRIPTION OF THE DRAWING

Further objects, features and advantages of the present invention will become more clear from the following detailed description of the drawing, wherein.

DETAILED DESCRIPTION OF THE DRAWING

Figure 1:
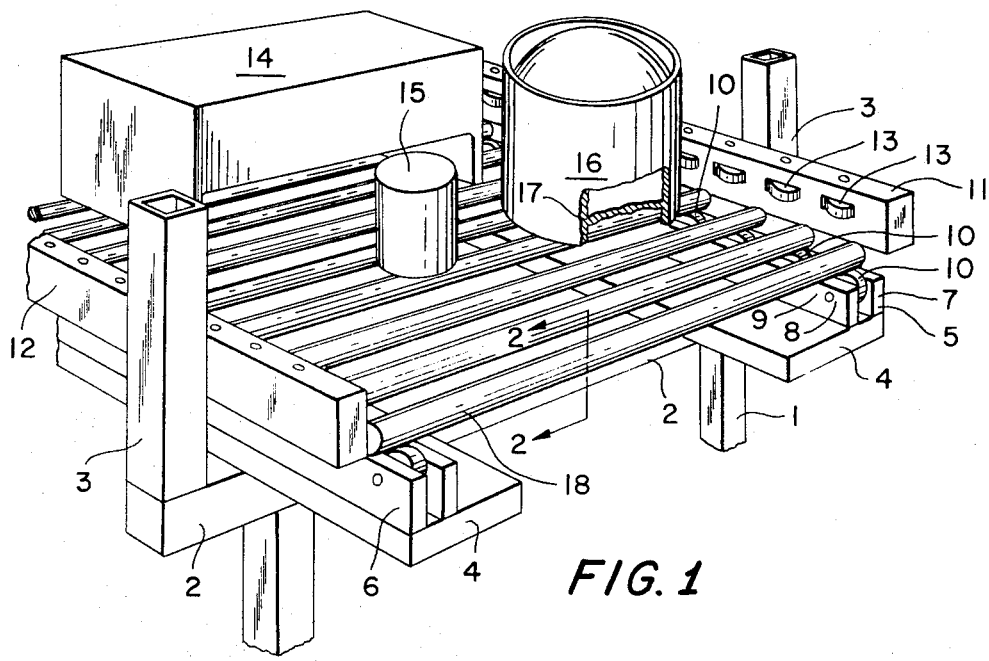
FIG. 1 is a partial perspective view of a portion of the conveyor system according to one embodiment of the present invention.

The embodiment of the conveyor system shown in FIG. 1 includes a frame structure of any appropriate type, and may include, for example, vertical upright supports 1, transverse supports 2 carried on the vertical supports 1, side rail supports 3 carried on the opposite ends of the transverse supports 2, and longitudinal rail supports 4, all of which may be constructed of metal and bolted or welded together. The above framework is set forth by way of example only, and it is understood that any other suitable type of framework may be employed.

A run 5 of horizontal axis rollers is mounted on one of the longitudinal rail supports 4 and parallel to a co-operating run 6 of horizontal axis rollers mounted on the other longitudinal rail support 4. While each of these runs include longitudinally aligned single rollers, as shown in applicant's above-mentioned U.S. Pat. No. 3,057,448, it is also contemplated that each of the runs may be of the heavier duty type employing two sets of longitudinally aligned rollers as set forth in applicant's above-mentioned U.S. Pat. No. 3,443,674. The disclosure of these two patents is incorporated herein in its entirety by reference. By way of a specific example, with runs 5 and 6 being identical, the run 5 is constructed of two opposed roller support rails 7, 8 rigidly mounted in spaced relationship from each other and receiving the opposite ends of roller shafts 9 freely rotatably mounting thereon respective rollers 10.

To generally longitudinally guide and prevent articles from transversely moving off of the conveyor, side article guiding rails 11, 12 are supported on the side rail supports 3 in generally parallel relationship with the runs 5, 6. Preferably, these side rails 11, 12 are provided with a plurality of vertical axis rollers 13, to provide an antifriction engagement with the sides of articles being conveyed.

Most preferably, the roller runs 5, 6 are inclined slightly downwardly in the conveying direction with respect to the horizontal, for conveying articles solely by gravity. As more fully set forth in applicant's above-mentioned patents, the roller runs 5, 6 will readily support articles having transverse dimensions at least as great as the generally fixed spacing between the runs 5, 6, for example industrial pallets, large boxes, and crates. Such will be set up for normal operation and the conveying of the majority of articles. However, there are many articles that do not lend themselves to this type of conveying. For example, their transverse dimensions may be insufficient to span the normal spacing of the runs 5, 6, and it may be impractical to reduce the spacing between the runs to accommodate such articles, for example the box 14 whose longest dimension is less than the dimension between the runs 5, 6. Further, even if the spacing between the runs 5, 6 was adjustable over a wide range, there are certain articles such as th small can 15 that is so small in transverse dimension that it would be impractical to reduce the spacing between the runs 5, 6 to accommodate such an article and further there would be the very real possibility of the article falling off of the conveyor to the right or left since there would be considerable spacing between the side rails 11, 12 and their immediate adjacent runs 5, 6 with such a set up to accommodate the can 15. Further, many large metallic barrels and the like 16 have relatively sharp rims 17 at their opposite ends; although such large barrels 16 may have a transverse dimension quite large and suitable for support between runs 5, 6 the nature of the sharp rim 17 would be such that it would fall between adjacent rollers 10 and prevent the conveying of the barrel. It is the above types of articles that cannot satisfactorily be conveyed on the above-described parallel run conveyor more fully disclosed in applicant's above-mentioned patents.

According to the system of the present invention, the parallel run gravity roller way conveyor above-described is convertible to a single run roll conveyor as shown in the drawings by providing a plurality of generally equal length pipes or rolls mountable on the rollers 10 in a generally inclined plane. Preferably, these rolls 18 are cut to equal lengths from stock lengths of pipe so as to have uniform diameter and thickness throughout their entire axial extent. Using such stock material, the rolls may be provided quite cheaply and are easily replaceable. As shown in FIG. 1, the left hand end of each roll 18 is supported between adjacent rollers 10 of the roller run 6, and the right hand end of each roll 18 is supported between adjacent rollers 10 on the rollers run 5. The diameters of the rolls 18, which are equal, the diameters of the rollers 10, which are equal, and the spacing between the shafts 9 are such that the rolls 18 are in firm driving engagement with the rollers 10 and vertically spaced above the roller support rails 7, 8. Thus it is seen that the rolls 18 are freely rotatable and supported solely by the freely rotatable rollers 10.

In the above manner, the rollers 18 provide a support surface for the above-mentioned types of articles 14, 15, 16 and many others. As more fully shown in FIG. 2, the side rails 11 vertically overlap, to some degree, the rollers 18 so as to limit their axial movement at least sufficiently so that they will not become disengaged with the rollers 10 at either end.

Further, the side rails 11, 12, with their vertical axis rollers 13, extend vertically above the rolls 18 sufficiently to perform their guiding function for the articles 14–16 being conveyed.

It is thus a simple and inexpensive procedure to convert the parallel run roller way conveyor of the applicant's above-mentioned patents into a single run roll conveyor according to the present invention using only standard and readily available components with a minimum of effort. The pipes or rolls 18 may thereafter be removed or readily stored or thrown away due to their being so inexpensive when it is desired to reconvert the conveyor into a parallel run roller way conveyor.

Figure 2:
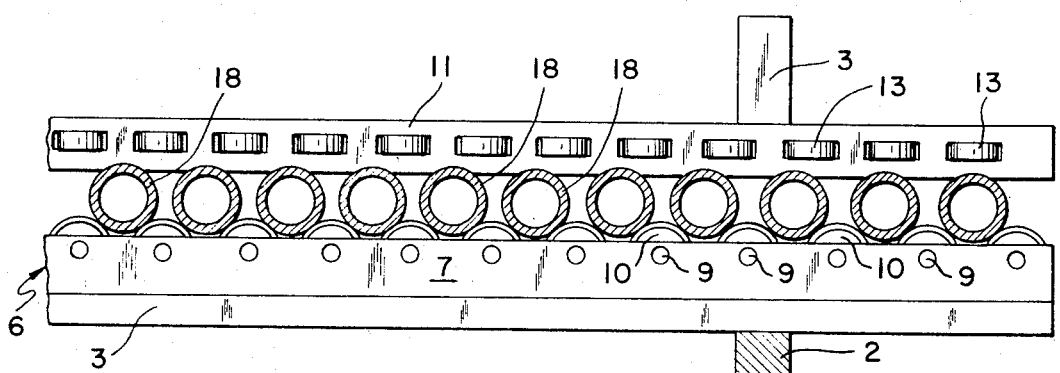
FIG. 2 is a partial cross sectional view taken along line 2—2 of FIG. 1.
Figure 3:
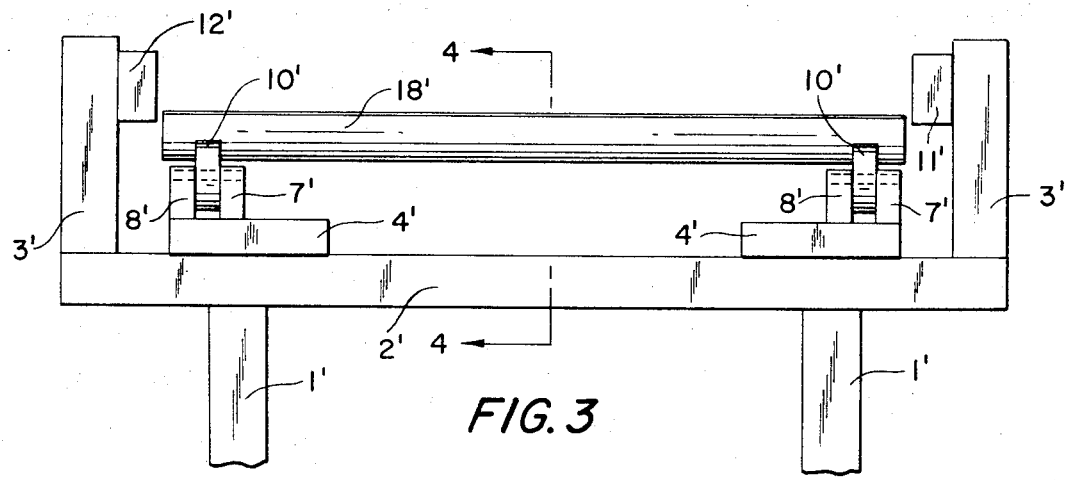
FIG. 3 is an end view of a second embodiment according to the present invention.
Figure 4:
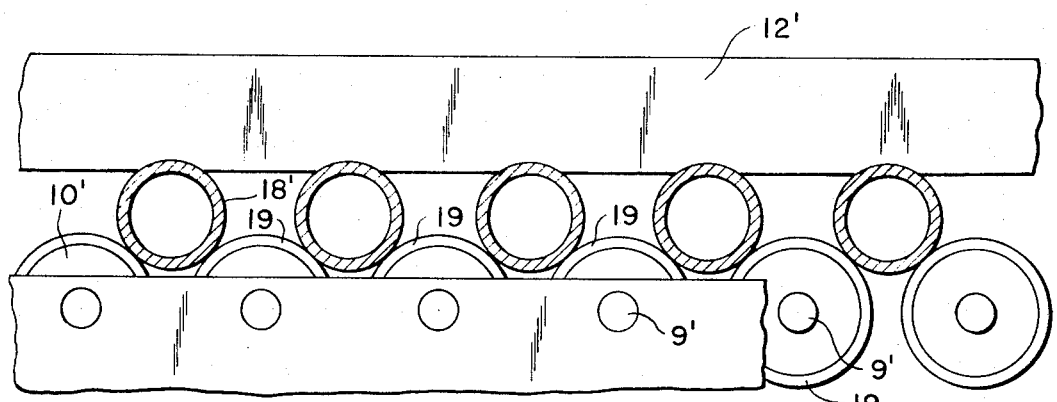
FIG. 4 is a partial cross sectional view taken along line 4—4 of FIG. 3.

The embodiment of FIGS. 3 and 4 is quite similar to the previously described embodiment of FIGS. 1 and 2, so that like numerals will be employed for like components and references made to the above description for such common components. Unlike FIG. 1, the side rails 11', 12' of FIG. 3 provide unbroken side vertical guide surfaces for the articles, that is, there are no vertical axis rollers 13 on the side rails as in FIG. 1. A further difference between the two embodiments lies in the construction of the rollers 10, which may be provided with elastomeric or resilient tires 19, which provide the sole engaging surface for the rolls 18'. Further, it is to be understood that the rollers 10 of FIG. 1 also may be constructed with elastomeric tires. Such elastomeric tires are more fully set forth in applicant's above-mentioned patents, with the resiliency of the elastomeric material preferably being within the range of a Shore durometer hardness of from 60 to 85A. Preferably, the hardness of the elastomeric material will be chosen according to the expected load to be encountered. With heavier loads, it is desirable to have a greater hardness for the tire material.

Instead of relying upon the side rails 11, 12 or 11', 12' to axially confine the rolls or pipes 18', the present invention further contemplates the special forming of the rolls 18, 18' with an annular groove 20 at each end, which may be formed by rolling, milling, grinding, or the like. This groove 20 will preferably register in a guiding manner with the rollers 10, 10' of a mounting channel 21, to provide for axial movement of the roll 18, 18' only to the extent of the difference in transverse dimension between the groove 20 and roller 10. Further, it is contemplated that the groove 20 may be replaced by merely a reduced diameter end portion for the rolls 18, 18'. While such a construction will allow the side rails 11, 12, 11', 12' to be spaced vertically higher than as shown in FIGS. 1–4 to more securely guide articles carried by the conveyor, the construction of FIG. 5 has the disadvantage that the rolls 18, 18' must be specially formed, that is, they cannot be merely cut lengths of standard pipe.

Figure 5:
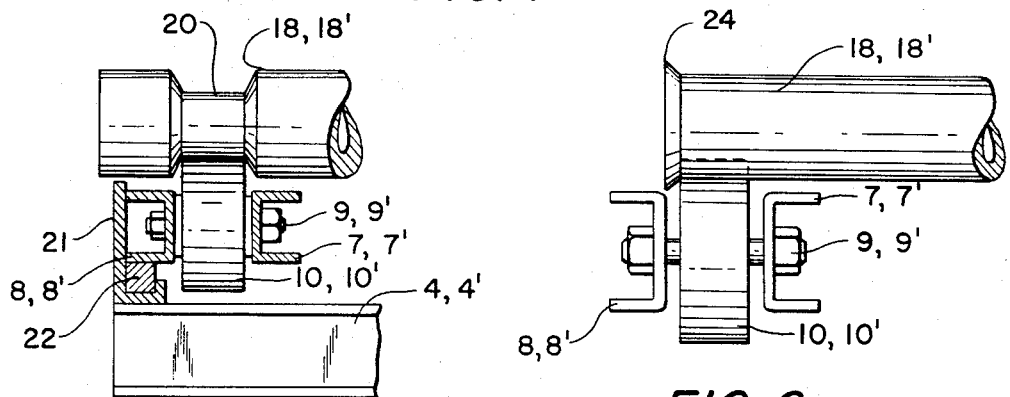
FIG. 5 is a detailed partial end view of a roll and roller mounting usable with either the embodiment of FIG. 1 or FIG. 3.

To reduce vibrations and noises, as well as to accommodate manufacturing tolerances, the roller support rails 7, 7', 8, 8' of FIGS. 1–4 preferably having the mounting as shown in FIG. 5, wherein, elastomeric material 22 is supportingly inserted between one of the roller support rails and the mounting channel or rail 21. Such a mounting is more fully shown in applicant's above-mentioned U.S. Pat. No. 3,057,448.

Figure 7:
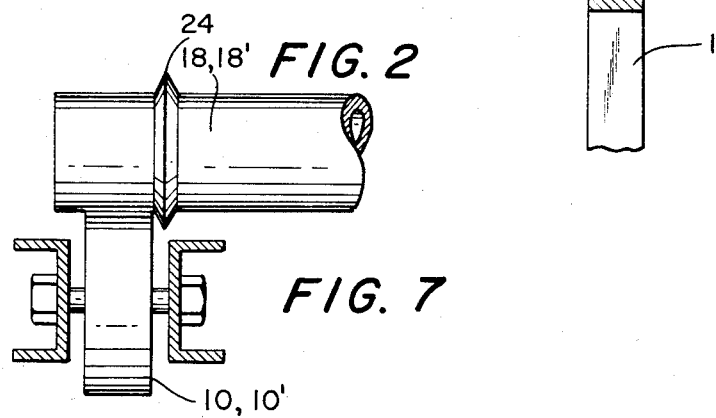
FIG. 7 is a partial end view of a roll and roller mounting usable with either the embodiment of FIG. 1 or FIG. 3.
Figure 6:
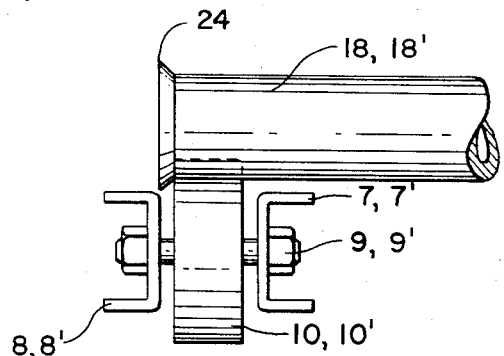
FIG. 6 is a partial end view of a roll and roller mounting usable with either the embodiment of FIG. 1 or FIG. 3.

As a further variation of the confining means for the rolls 18, 18', FIG. 6 employs a flange 23 formed by rolling, welding or the like integrally on each end of each roll 18, 18' so that it will vertically overlap the rollers 10, 10' to prevent axial movement of the rolls 18, 18' beyond a predetermined range. FIG. 7 shows a variation identical in use and description to that of FIG. 6, but employing a flange 24 to the inside of the roller 10, 10' for each end of the rolls 18, 18'.

The operation of the above conveyors either according to the above-mentioned patents or for the conveying of articles of the type shown at 14–16 in FIG. 1 has been described along with the appropriate structure for conversion between the two types of conveyors. Further, the method of conversion has likewise been set forth during the descriptive portion of the specification.

The elastomeric tires are of particular importance in supporting the rolls 18, 18' for the following reasons. With the usage of standard piping, the elastic engaging surface of the rollers will accommodate manufacturing imperfections, dirt, misalignment, and surface imperfections resulting from misuse. Thus, the conveyor system operating with the rolls 18, 18' will have considerably less vibration and noise than would be the case with hard surfaced rollers. Further, the elastomeric tired surface for the rollers will provide for placement of the rolls on the rollers so that there will be acute angle between the parallel axes of the rolls and the parallel axes of the rollers, which may be desirable to convey articles generally in the conveying direction perpendicular to the axes of the rollers, while moving such articles to one side of the conveyor against the appropriate side rail for automatic processing or the like. With elastic tired rollers, there will be contact across the full transverse dimension of the roller surfaces, whereas with inelastic surface rollers, there would be only rim contact or edge contact.

A further advantage of the elastic tired rollers in combination with the rolls, is that articles having non-planar support surfaces may be more readily conveyed than if the rolls were supported on inelastic rollers. let it be assumed that a load having a plurality of narrow support rails generally parallel to and of a dimension to extend between the rolls is to be conveyed. With inelastic rollers supporting the rolls, the narrow rails will strike the rolls and be required to ride up over the rolls, which will have the effect of either stopping the load by this interference or requiring an inclination of the conveyor system so great that for smooth support surface articles the conveying speed would be intolerable. With the combination of the present invention, the rolls or pipes when struck would move downwardly correspondingly deforming their elastic support surface provided by the elastomeric tires of the rollers; the inertia of the rollers will be considerably less than heavy articles, for example articles weighing from 1,000 to 14,000 lbs., so that it is seen the operation with the combination of the present invention will be far smoother and not require great inclinations. Further, many industrial pallets although having bottom rails parallel to the support rolls would have defective rails, particularly when made of wood that may be warped or split downwardly to provide a single edge considerably lower than the general support plane for the pallet, which edge would have the problems mentioned immediately above to be overcome by the present invention with the rolls moving downwardly deforming their elastic support.

If the rolls were inelastically supported on inelastic or rigid rollers, there would be an uncontrolled buildup of speed for articles as they move down the gravity conveyor, with such speed increasing with the length of the conveyor.

This would present a considerable problem in that if the inclination were reduced the articles may hang up at the beginning of the conveyor, whereas if the inclination were increased, the speed at the end of the conveyor may result in damage of equipment or articles being conveyed, as well as danger to operating personnel in the vicinity. This can be a particular problem when it is realized that single articles as heavy as 14,000 lbs. may be conveyed with the system according to the present invention.

There is a further characteristic of the resilient support for the rigid rolls or pipes, in that energy will be consumed by the deformation of the elastomeric tires as they deform under the load transferred to them by the rigid pipes. Such may provide a hysteresis control that will tend to move articles along the conveyor within a narrow range of speed, which will change only slightly with relatively great changes in the weight of articles being conveyed. If articles are given a shove at the upper end of the conveyor to provide an initial speed greater than this range, the hysteresis effect will reduce the speed of the articles, and similarly if the articles start out at a speed lower than the speed range, the speed of the article will quickly be brought up to the desired range and thereafter remain substantially constant. In contrast, if the rollers were provided with a hard inelastic surface for supporting the inelastic rigid rolls, the speed of travel for the articles down the conveyor would increase substantially the entire length of the conveyor, and the differences in speed resulting in substantially different weight changes of articles being conveyed would be quite dramatic.

It is estimated that due to this hysteresis effect, the 30 feet per minute speed of an empty pallet for a typical conveyor would be reduced to approximately 10 feet per minute for a thousand pound load, approximately 5 feet per minute for a 4,000 pound load, and approximately 3 feet per minute for a 9,000 pound load, and with very little change in speed with increased load thereafter, at least up to fifteen thousand pounds. In contrast, for a similar conveyor constructed without the resilient tires, that is with inelastic or rigid rollers and rolls, it is estimated that the one thousand pound load would reach a speed of approximately 240 feet per minute and heavier loads would correspondingly increase in speed, with the above-estimated figures being for a 40 foot long conveyor system. With this built in speed control, there will be less damage to articles being conveyed and there will be no need for expensive stops, breaks, and the like.

While preferred embodiments of the present conveyor system have been set forth along with variations, further embodiments, modifications, and variations are contemplated within the spirit and scope of the present invention as defined by the following claims.

What is claimed is:

1. A gravity conveyor roller way, comprising: at least two parallel support rails horizontally spaced from each other a predetermined distance and inclined a small acute angle with respect to the horizontal; a plurality of parallel, horizontal axis undriven wheels journaled for free rotation along each of said support rails, each of said wheels having an outer annular elastomeric tire with high hysteresis and low coefficient of restitution properties; means for transfering the load of articles between said rails to said wheels and the free rotation of said wheels to the articles including a plurality of generally parallel cylindrical rolls of substantially the same length at least greater than the predetermined distance between said support rails, each of said rolls being solely supported at one end between a pair of adjacent ones of said freely journaled wheels on one of said support rails and being solely supported at its opposite end between a corresponding pair of adjacent ones of said freely journaled wheels mounted on the other of said support rails, and each of said rolls being solely supported by direct engagement with said high hysteresis elastomeric tires; the top surfaces of said rolls generally lying in a support plane inclined at said acute angle with respect to the horizontal; and means confining the axial movement of said rolls to a predetermined range sufficiently small to maintain said rolls fully supported at both ends on said wheels; said rolls and said wheels constituting means for moving articles soley by gravity horizontally and downwardly generally parallel with said rails; speed control means including said high hysteresis elastomeric tires for increasing the speed of articles being gravity conveyed on said rolls up to a predetermined narrow speed range; said speed control means further decreasing the speed of articles being gravity conveyed on said rolls to said predetermined speed range by converting the kinetic energy of the articles above said predetermined narrow speed range to heat by the high hysteresis properties of said tires; and said speed control means further decreasing the speed of articles within said predetermined narrow speed range as the weight of the articles increases.

2. The gravity conveyor of claim 1, wherein said rolls are each of uniform diameter and thickness throughout their entire length.

3. The gravity conveyor of claim 1, wherein said tires have shore durometer hardness of from 60 to 85A.

4. The gravity conveyor of claim 1, wherein said confining means include opposed side rails substantially parallel to each other and said support rails, and each of said rails abuttingly overlapping, in the vertical direction, each of said rolls and extending upwardly beyond said pipes a sufficient distance to guide articles carried on said rolls.

5. The gravity conveyor of claim 4, including a plurality of vertical axis free rollers mounted in alignment with each other completely above said rolls and in said side guide rails to extend inwardly therefrom for engaging the sides of articles carried on said rolls.

6. The gravity conveyor of claim 1, wherein said confining means includes an outer annular groove within each of said rolls at each end thereof and spaced to coincide with the spacing of the supporting wheels so that the wheels riding in the grooves act to prevent lateral movement of the rolls.

7. The gravity conveyor of claim 6, wherein said side support rails each includes parallel and outwardly horizontally opening U-shaped side channel members mounting therebetween said wheels, and at least one U-shaped horizontally opening mounting channel receiving therein one of said side channel members; and elastomeric means supportingly between said one side channel and said mounting channel.

8. The gravity conveyor of claim 1, wherein said confining means include an annular flange integrally on each end of each of said rolls, each of said annular flanges extending downwarldy to cooperate with one side of each of the supporting wheels.

9. The gravity conveyor of claim 1, wherein said speed control means produces the narrow speed range of three feet per minute for a 9,000 pound load and 30 feet per minute for an empty pallet load.

* * * * *